US008833555B2

(12) United States Patent
Bennett, Jr.

(10) Patent No.: US 8,833,555 B2
(45) Date of Patent: Sep. 16, 2014

(54) CASE HAVING AN INTERCHANGEABLE COVER

(75) Inventor: James F. Bennett, Jr., Wellesley, MA (US)

(73) Assignee: Verso Brand Holdings, LLC, New York, NY (US)

(*) Notice: Subject to any disclaimer, the term of this patent is extended or adjusted under 35 U.S.C. 154(b) by 69 days.

(21) Appl. No.: 13/471,234

(22) Filed: May 14, 2012

(65) Prior Publication Data

US 2012/0287565 A1 Nov. 15, 2012

Related U.S. Application Data

(60) Provisional application No. 61/486,190, filed on May 13, 2011.

(51) Int. Cl.
| | | |
|---|---|---|
| *B65D 85/00* | (2006.01) | |
| *A45C 11/00* | (2006.01) | |
| *A45C 13/00* | (2006.01) | |
| *B65D 5/52* | (2006.01) | |
| *G06F 1/16* | (2006.01) | |

(52) U.S. Cl.
CPC ............. *A45C 11/00* (2013.01); *B65D 5/5206* (2013.01); *G06F 1/166* (2013.01); *A45C 13/005* (2013.01); *A45C 2011/003* (2013.01)
USPC ...................................... 206/320; 206/45.24

(58) Field of Classification Search
CPC ........ A45C 11/00; A45C 2011/001–2011/003; H04M 1/18; B65D 5/5206
USPC ............ 206/320, 45.2, 37, 38, 579, 751, 755, 206/762, 764, 45.21, 305, 472–475, 206/45.23–45.26, 45.28; 220/810, 220/4.22–4.23, 837, 836, 848; 361/679, 361/680
See application file for complete search history.

(56) References Cited

U.S. PATENT DOCUMENTS

| | | | | |
|---|---|---|---|---|
| 6,266,240 | B1 * | 7/2001 | Urban et al. ............. | 361/679.56 |
| 7,387,209 | B2 * | 6/2008 | Ko et al. ........................ | 206/579 |
| 8,132,670 | B1 * | 3/2012 | Chen ............................ | 206/320 |
| 8,264,310 | B2 * | 9/2012 | Lauder et al. ................. | 335/219 |
| 8,289,115 | B2 * | 10/2012 | Cretella et al. ................ | 335/219 |
| 2004/0118743 | A1 * | 6/2004 | Yang et al. .................... | 206/701 |
| 2006/0226040 | A1 * | 10/2006 | Medina ......................... | 206/320 |
| 2008/0053851 | A1 * | 3/2008 | Ko et al. ........................ | 206/320 |

FOREIGN PATENT DOCUMENTS

KR 100996722 11/2010

OTHER PUBLICATIONS

International Search Report with Written Opinion dated Aug. 1, 2012 corresponding to PCT/US2012/037823.

* cited by examiner

*Primary Examiner* — Mickey Yu
*Assistant Examiner* — Chun Cheung
(74) *Attorney, Agent, or Firm* — Seyfarth Shaw LLP

(57) ABSTRACT

An apparatus for protecting an electronic device includes a first protective cover component and a second protective component that may be removably coupled to one another. The second protective cover component includes a hinge component having a flexible hinge portion extending from a peripheral portion of the second protective cover component, wherein the hinge component facilitates coupling of the second protective cover component to the first protective cover component. One of the first protective cover component and the second protective cover component include a region configured to receive the electronic device.

24 Claims, 16 Drawing Sheets

CASE HAVING AN INTERCHANGEABLE COVER

CROSS REFERENCE TO RELATED APPLICATIONS

The present application claims priority to U.S. Provisional Application No. 61/486,190, filed May, 13, 2011, entitled "CASE HAVING AN INTERCHANGEABLE COVER," which application is incorporated herein by reference in its entirety.

BACKGROUND

Electronic devices such as e-readers and tablet computers have become more common in recent years. Such electronic devices are often used as a source of visual information. Due, in part, to the portability of such electronic devices, they are susceptible to wear or damage from other objects, liquids, etc. In an effort to limit the susceptibility to wear and damage, some users obtain a case or a cover for their devices. Protective covers may be selected by a user because of their functionality and/or because of their appearance. Because many users use protective covers as an outer carrying case for their electronic devices, the visual appearance of the protective cover (e.g., including color, images, designs, text, etc. provided on the protective cover) are often taken into consideration by a user when deciding which protective cover to purchase. Throughout the useful life of the electronic device, a user's need or preference for a particular protective cover may vary.

SUMMARY

The present application relates generally to the field of portfolios or cases designed to hold a source of visual information (e.g., electronic devices such as e-readers and tablet computers, and non-electronic devices such as conventional books, magazines, etc.). More specifically, the present application relates to the components, configurability and assembly of such cases.

The inventors have appreciated that versatility and flexibility may be provided by inventive embodiments of a protective cover adapted to readily change in connection with a user's desire to vary the appearance of a protective cover. In view of the foregoing, the present disclosure is directed to inventive methods and apparatuses for protecting a source of visual information such as an electronic device.

Various exemplary inventive embodiments disclosed herein provide an apparatus for protecting an electronic device. The apparatus includes a protective cover having at least one of a first protective cover component and second protective cover component. The first protective cover component includes a peripheral portion having a channel disposed therein. The channel has a longitudinal axis and one or more peripheral walls extending along the longitudinal axis in the peripheral portion of the first protective cover component. The channel includes an opening in at least one of the one or more peripheral walls. The opening extends along the longitudinal axis and at least partially along the at least one of the one or more peripheral walls. At least a portion of the opening is narrower than at least a portion of the channel. The second protective cover component includes a hinge component extending from a peripheral portion of the second protective cover component. The hinge component includes a hinge portion shaped to correspond to the channel in the first protective cover component. At least one of the first protective cover component and the second protective cover component include a recessed region configured to receive the electronic device.

In accordance with one inventive embodiment, the protective cover includes the first protective cover component and the second protective cover component and in some inventive embodiments, the first protective cover component and the second protective cover component are releasably coupled via the channel and the hinge portion.

The first protective cover component may be rotatably coupled to the second protective cover component, in accordance with exemplary inventive embodiments.

The hinge component may include a flexible hinge portion. The flexible hinge may be composed of rubber. The hinge portion shaped to correspond to the channel in the first portion may include a rod coupled to the flexible hinge portion. The rod may include a round cross-section, a circular cross-section, an oval cross-section, a rectangular cross section, or a polygonal cross section. The rod may include a flange positioned at an end of the rod. The flange may be wider than the channel, whereby the flange prevents the rod from sliding completely through the channel.

In various inventive embodiments, at least one of the first protective cover component and the second protective cover component include a foldable flap coupled thereto, configured such that in a folded state the flap is parallel to a surface of the protective cover component and in an unfolded state the flap extends from the surface. The foldable flap may be connected to a tether. The tether may be connected to at least one of the first protective cover component and the second protective cover component.

The protective cover may include the first protective cover component, in accordance with exemplary inventive embodiments and the first protective cover component may include the recessed region configured to receive the electronic device. In related embodiments, the second protective cover component includes a ridge shaped to correspond at least partially to the recessed region. In further related embodiments the second protective cover component includes a magnetic switched configured to switch an electronic device positioned in the first protective cover component on or off.

In other exemplary inventive embodiments, the protective cover includes the second protective cover component and the second protective cover component includes the recessed region configured to receive the electronic device. In related embodiments, the first protective cover component includes a ridge shaped to correspond at least partially to the recessed region. In yet further related embodiments, the first protective cover component includes a magnetic switched configured to switch an electronic device positioned in the second protective cover component on or off.

In various inventive embodiments, at least one of the first protective cover component and the second protective cover component is composed, at least in part, of a material selected from the group including: a rubber, a leather, a fabric, a polymer, a plastic.

In some inventive embodiments, at least one of the first protective cover component and the second protective cover component includes one or more apertures permitting access to a port in an electronic device positioned within one of the first protective cover component and the second protective cover component.

The channel may, in various inventive embodiments, include an opening at a first end and a second end of the channel.

The one or more peripheral walls of the channel may be discontinuous in accordance with various inventive embodiments.

In another exemplary inventive embodiment, an apparatus for protecting an electronic device is provided. The apparatus includes a first cover component and a second cover component removably coupled to the first cover component. The second protective cover component includes a hinge component having a flexible hinge portion extending from a peripheral portion of the second protective cover component. The second protective component is removably coupled to the first protective component via the hinge component. At least one of the first protective cover component and the second protective cover component include a region configured to receive the electronic device.

In a related embodiment, the flexible hinge portion includes a fabric.

In another related embodiment, the region configured to receive the electronic device includes a recessed region in the protective cover component.

Another exemplary inventive embodiment provides a method of protecting an electronic device. The method includes slidably coupling a first protective cover component to a second protective cover component, such the first component is rotatable with respect to the first component. The method also includes positioning the electronic device in at least one of the first and second protective cover components. The first protective cover component includes a peripheral portion having a channel disposed therein. The channel includes a longitudinal axis and one or more peripheral walls extending along the longitudinal axis in the peripheral portion of the first protective cover component. The channel includes an opening in at least one of the one or more peripheral walls, the opening extending along the longitudinal axis and at least partially along the at least one of the one or more peripheral walls, at least a portion of the opening narrower than at least a portion of the channel. The second protective cover component includes a hinge component extending from a peripheral portion of the second protective cover component. The hinge component includes a hinge portion shaped to correspond to the channel in the first protective cover component.

In accordance with various inventive embodiments, a kit for protecting an electronic device is provided. The kit includes a first component including a region adapted to receive the electronic device. The kit further includes a plurality of second components each having a distinct aesthetic appearance, wherein at least one of the first component and each of the second component in the plurality of second components includes a peripheral portion having a channel disposed therein. The channel includes a longitudinal axis and one or more peripheral walls extending along the longitudinal axis in the peripheral portion of the at least one of the first component and each of the second component in the plurality of second components. The channel includes an opening in at least one of the one or more peripheral walls, the opening extending along the longitudinal axis and at least partially along the at least one of the one or more peripheral walls, at least a portion of the opening narrower than at least a portion of the channel. Additionally, at least one of the first component and each of the second component in the plurality of second components includes a hinge component extending from a peripheral portion of the second protective cover component. The hinge component includes a hinge portion shaped to correspond to the channel in the first protective cover component, whereby the first component and at least one of the second components in the plurality of second components are removably couplable via the hinge and the channel.

One inventive embodiment relates to a protective case designed to hold a source of visual information (e.g., electronic devices such as e-readers and tablet computers, and non-electronic devices such as conventional books, magazines, etc.). The case includes a first cover portion having a first coupling interface. The case also includes a second cover portion that is configured to receive the source of visual information. The second cover portion has a second coupling interface. The first coupling interface is configured to be detachably coupled to the second coupling interface so that a user can selectively interchange the first cover portion with a new or different first cover portion.

Further combinations and sub-combinations of various concepts are provided below in the claims section. It should be appreciated that all combinations of such concepts and additional concepts discussed in greater detail below (provided such concepts are not mutually inconsistent) are contemplated as being part of the inventive subject matter disclosed herein. In particular, all combinations of subject matter appearing as numbered claims at the end of this disclosure are contemplated as being part of the inventive subject matter disclosed herein. In addition, all combinations of subject matter supported by this disclosure, including the drawings, the description and the claims, are contemplated as being part of the inventive subject matter even if not expressly recited as one of the numbered claims. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
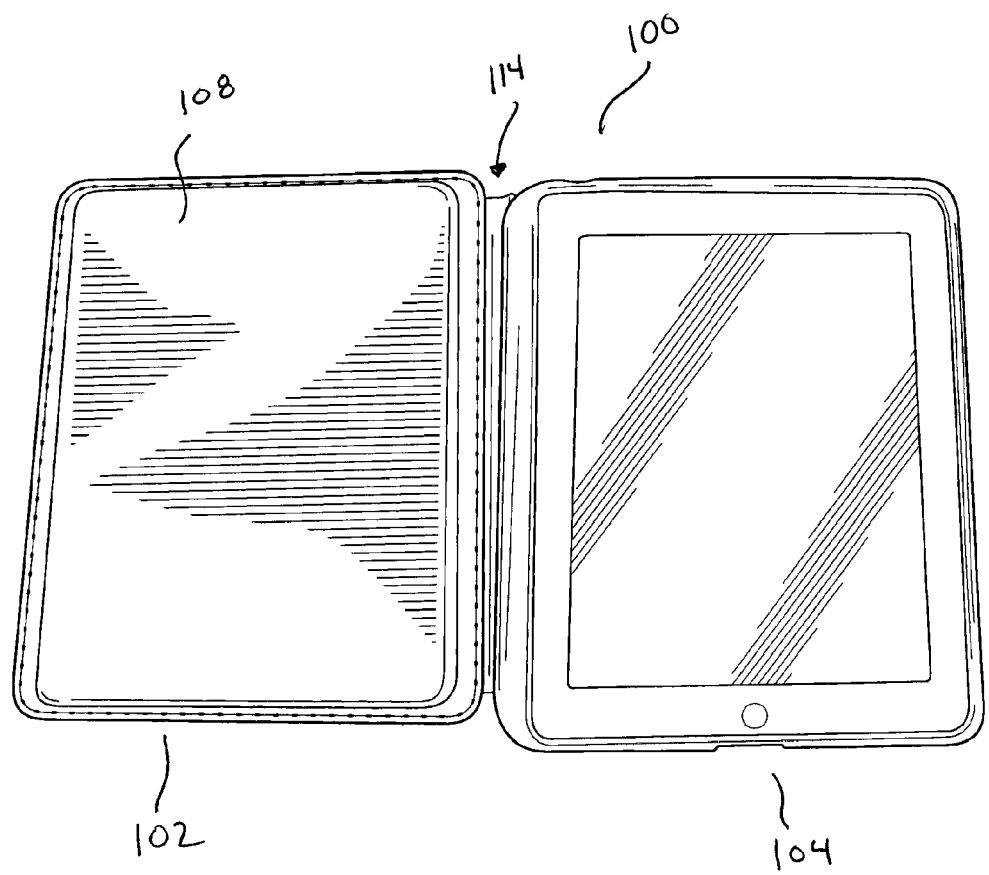
FIG. 1 is a top perspective view of an open case according to an exemplary embodiment shown in a open configuration.

The features and advantages of various inventive embodiments will become more apparent from the detailed description set forth below when taken in conjunction with the drawings.

DETAILED DESCRIPTION

Following below are more detailed descriptions of various concepts related to, and embodiments of, inventive systems, methods and apparatus for protecting a source of visual information and particularly electronic sources of visual information. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Referring generally to the FIGURES, a case (e.g., protective cover, portfolio, etc.) for transporting and/or supporting a source of visual information is shown according to an exemplary embodiment. Examples of sources of visual information include, but are not limited to, electronic devices such as e-readers (e.g., the Amazon Kindle, the Amazon Kindle DX, the Sony Reader, the Barnes and Noble Nook), tablet computers, laptop computers, portable movie players, and portable game devices, and non-electronic devices such as books, newspapers and magazines.

For exemplary purposes only, the case or cover will be described in detail herein as a case or cover that is configured to receive and support an electronic device, and more specifically a tablet computer. The description of the case in this manner is not intended to be limiting. As set forth above, the case may be suitable for use with other electronic devices and for use with non-electronic devices.

The case generally includes a first cover portion and a second cover portion coupled to the first cover portion. At least one of the first cover and the second cover portion is configured to receive and hold the electronic device. The first cover portion may be pivotally coupled to the second cover about a hinge so that the case can be moved between a closed position and one or more open positions. The first cover portion is also detachably coupled to the second cover portion so that a user may selectively interchange the first cover portion with another first cover portion while maintaining the same second cover portion. Providing a user with the ability to selectively interchange the first cover portion with another first cover portion allows the user to change the appearance and/or functionality of the case without having to replace the entire case. To facilitate the detachable coupling, the first cover portion includes a first interface and the second cover portion includes a corresponding second interface. According to one exemplary embodiment, the first interface and the corresponding second interface allow for the slidable movement of the first cover portion relative to the second cover portion.

Before discussing further details of the case, it should be noted that references to "front," "back," "rear," "upper," "lower," "right," and "left" in this description are merely used to identify the various elements as they are oriented in the FIGURES, with "front," "back," and "rear" being relative to the orientation of the case when sitting closed in front of a user with a hinge portion of the case being provided at the left side of the user. These terms are not meant to limit the element which they describe, as the various elements may be oriented differently in various applications.

It should further be noted that for purposes of this disclosure, the term coupled means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 2:
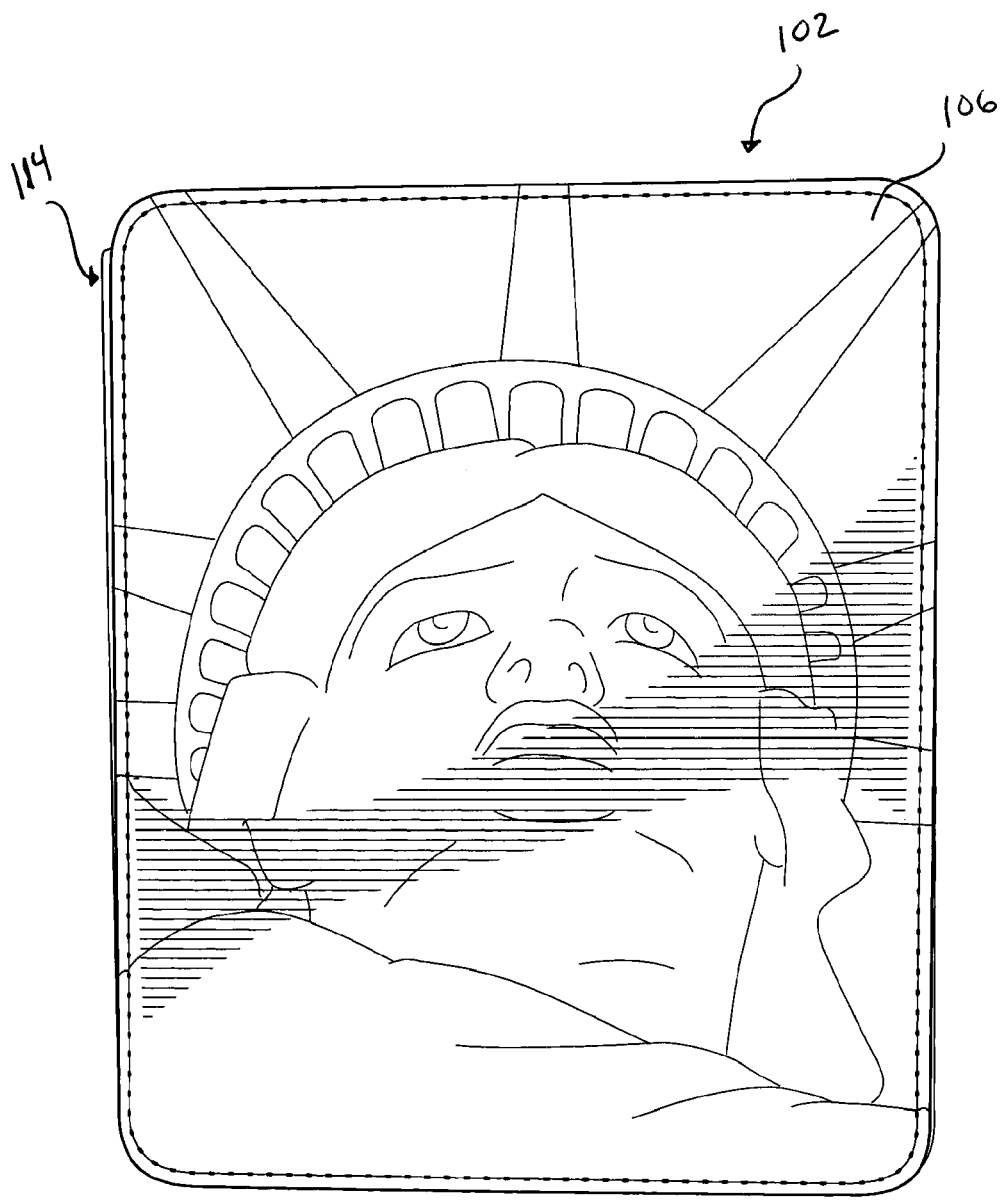
FIG. 2 is a top perspective view of the closed case of FIG. 1 showing the outer front portion of the case of FIG. 1.
Figure 3:
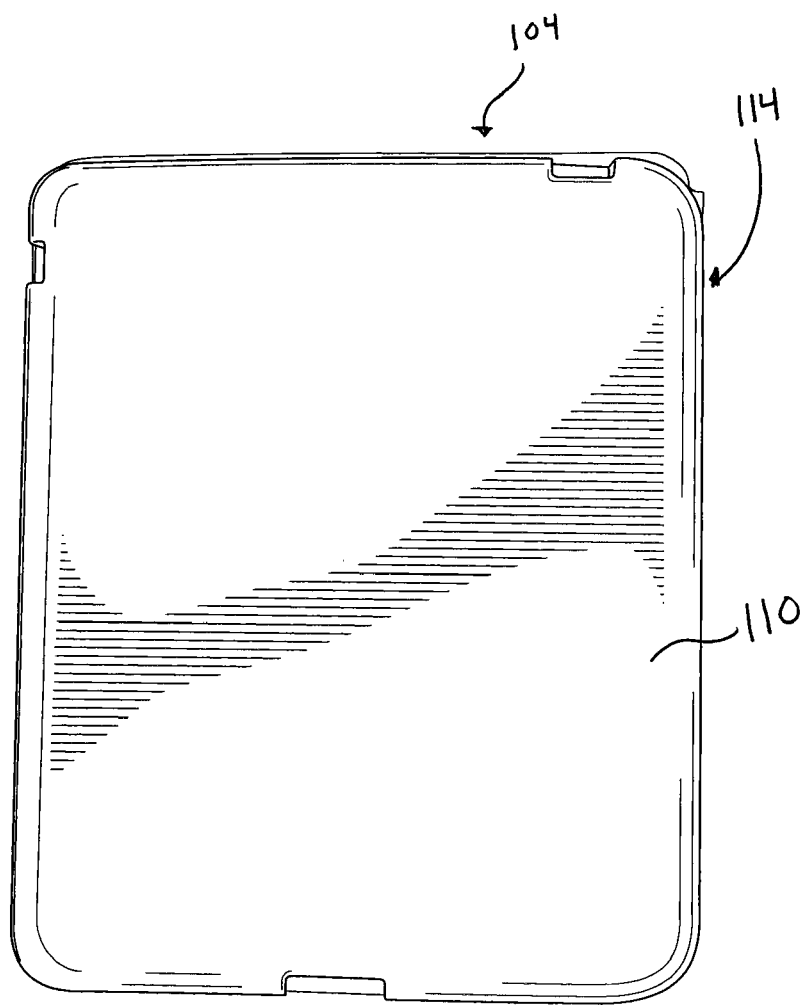
FIG. 3 is a rear perspective view of the closed case of FIG. 1 showing the outer back portion of the case of FIG. 1.

Referring to FIGS. 1-3 in particular, a case 100 is shown according to an exemplary embodiment. The case 100 includes a first portion, shown as a front cover 102 (see FIGS. 1 and 2), and a second portion, shown as a rear cover 104 (see FIGS. 1 and 3). The front cover 102 has an exterior surface 106 and an interior surface 108. Likewise, the rear cover 104 has an exterior surface 110 and an interior surface 112. According to an exemplary embodiment, the front cover 102 is pivotally coupled to the rear cover 104 about a hinge 114 such that the front cover 102 may be selectively moved by a user between a closed or stowed position, a first open or use position and a second open or use position, as well as any of a number of positions therebetween.

In the closed position, as shown in FIGS. 2 and 3, the front cover 102 overlaps the rear cover 104 and the interior surface 108 of the front cover 102 is opposed to the interior surface 112 of the rear cover 104. According to the embodiment illustrated, the front cover 102 and the rear cover 104 are configured to cover the entire surface of the electronic device in the closed position to provide protection for all surfaces of the electronic device. In the first open position, as shown in FIG. 1, the front cover 102 is rotated from the closed position approximately 180 degrees relative to the rear cover 104. After being rotated approximately 180 degrees, the front cover 102 is disposed in substantially the same plane as the rear cover 104 and does not overlap the rear cover 104. Such an open position may be particularly suitable if the case 100 is being used to support and illuminate a conventional book. In the second open position, not shown, the front cover 102 is pivoted from the closed position approximately 360 degrees relative to the rear cover 104. After being rotated approximately 360 degrees, the front cover 102 overlaps the rear cover 104 and the exterior surface 106 of the front cover 102 is adjacent to the exterior surface 110 of the rear cover 104.

Such an open position may be particularly suitable if the case is being used to support an electronic device.

Figure 4:
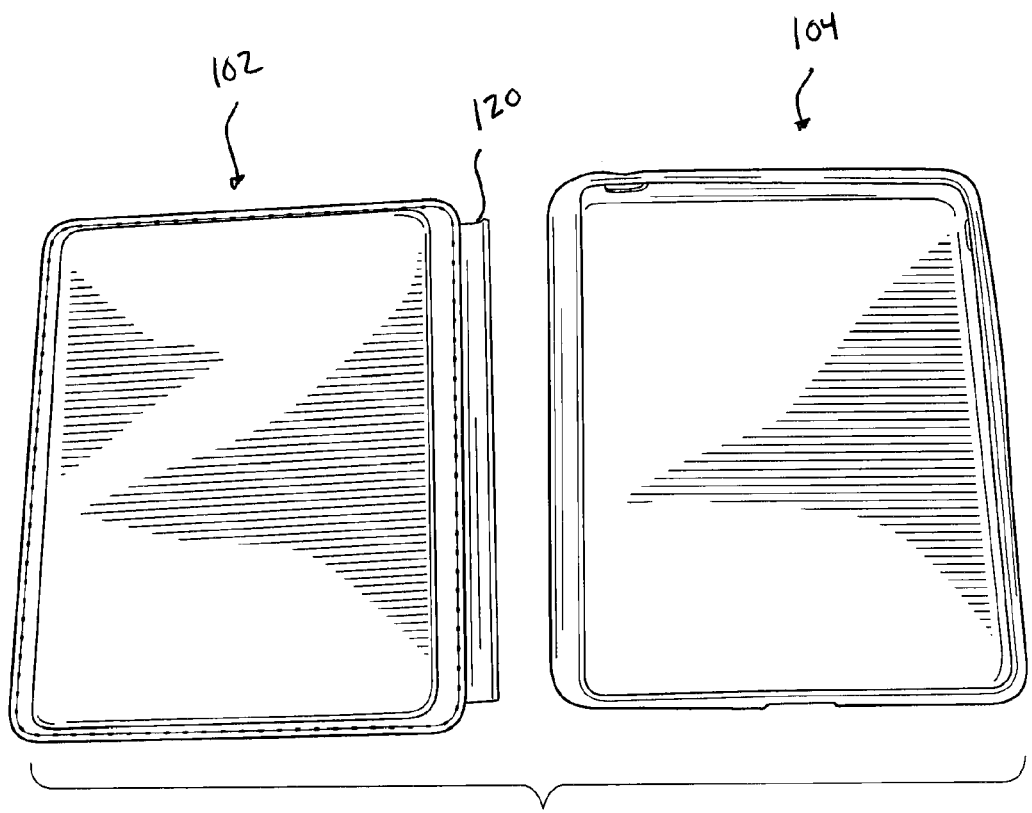
FIG. 4 is a top perspective view of the case of FIG. 1 with the front and back portions of the case uncoupled.
Figure 5:
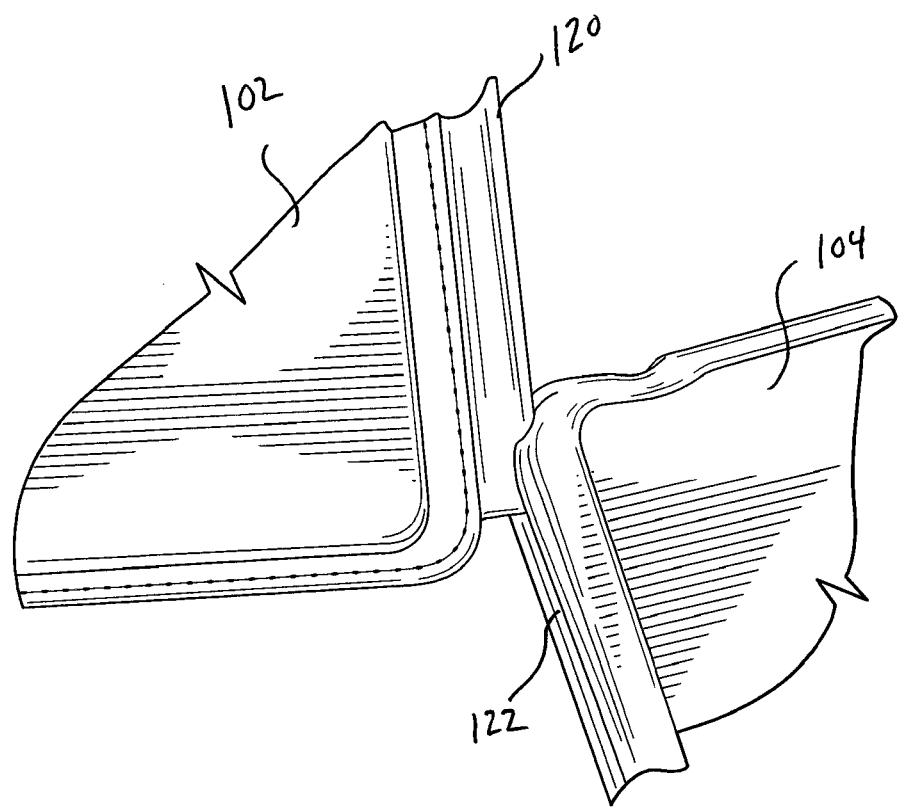
FIG. 5 is magnified perspective view of a first cover portion of the case of FIG. 1 being coupled to a second cover portion of the case of FIG. 1.

Referring to FIG. 4, the front cover 102 and the rear cover 104 are formed as separate members. The exterior surfaces 106, 110 may be formed from one or more first materials, while the interior surfaces 108, 112 may be formed from one or more second materials that are different from the first materials. For example, the first materials may be a more durable material designed to protect against sharp objects and/or contaminants such as dirt, sand, and/or liquids, while the second materials may be a more plush material designed to cushion the electronic device and/or provide soft surface for the user. Because the front cover 102 and the rear cover 104, the exterior surfaces 106, 110 and/or the interior surfaces 108, 112 may be easily formed of different materials if desirable. Alternatively, they may be formed of the same materials.

According to an exemplary embodiment, the front cover 102 is formed as a panel having more than one layer. For example, the front cover 102 includes an outer printed layer that includes indicia (e.g., images, designs, text, etc.), shown for exemplary purposes as an image of the Statue of Liberty. According to an exemplary embodiment, the exterior surfaces may be formed of fiscagomma polyurethane, leather, canvas, vinyl, etc. In addition to the outer printed layer, the front cover 102 includes an inner structural panel having a relatively soft, plush, compressible and/or padded interior surface to cushion the electronic device. The rear cover 104 may be formed in a similar manner or may have a different configuration. According to an exemplary embodiment, the rear cover 104 is formed as a panel having a single layer. For example, according to an exemplary embodiment, the interior surface 108 of the front cover 102 and the interior surface 112 of the rear cover may be formed of microfiber, leather, suede or other soft materials.

As noted above, the rear cover 104 is configured to receive and support an electronic device, shown as a tablet computer 116 in FIG. 1. According to an exemplary embodiment, the rear cover 104 may include a mounting system to assist in securing the electronic device to the case 100. For example, the mounting system may be a four point mounting system that holds the electronic device in place against the interior surface of 112 of the rear cover 104. Such a mounting system may include, for example, corner supports, (e.g., diagonal straps, etc.), that are coupled to the interior surface 112 of the rear cover 104. The straps can each define an aperture configured to engage the corresponding corner of the electronic device. The straps may be somewhat elastic in nature to help secure the electronic device against the interior surface 112 of the back cover 104. According to the various alternative embodiments, the outer periphery of the rear cover 104 may be sized such that it can retain the electronic device without the need for an additional mounting system.

As noted above, the front cover 102 and the rear cover 104 are formed as separate members. According to an exemplary embodiment, the front cover 102 is configured to be detachably coupled to the rear cover 104. The detachable coupling between the front cover 102 and the rear cover 104 allows a user may selectively replace and/or interchange an existing front cover with a new or different front cover. Providing a user with the ability to selectively replace and/or interchange the front cover 102 with a new or different front cover allows the user to change the appearance and/or functionality of the case 100 without having to replace the entire case 100. For example, the rear cover 104 can be retained and used with any of a number of front covers.

To facilitate the detachable coupling, the front cover 102 includes a first coupling interface 120 and the rear cover 104 includes a corresponding second coupling interface 122. The first and second coupling interfaces 120, 122 may include complimentary mating interfaces, such as slot and key interfaces (i.e., where the first coupling includes one of a slot and a projecting member that fits into the slot and the second coupling interface includes the other of the slot and the projecting member). Such slot-and-key interfaces may also include a locking mechanism in which one of the slot and the projecting member includes a locking tab to facilitate locking engagement between the slot and the projecting member. According to such an embodiment, the other of the slot and the projecting member can include an optional depression to receive the locking tab.

Figure 6:
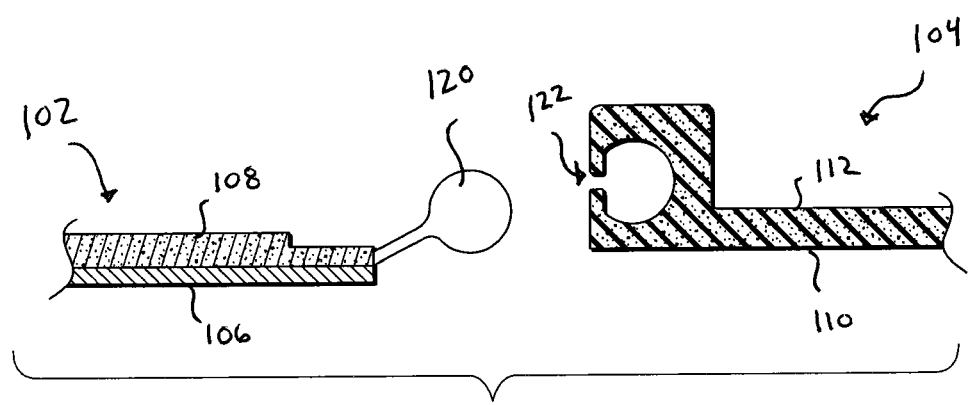
FIG. 6 is a partial cross sectional view of the first cover portion and the second cover portion of the case of FIG. 1.

Referring to FIG. 6, and according to an exemplary embodiment, the first coupling interface 120 is in the form of a projection, specifically a circular rod, and the second coupling interface 122 is in the from of a groove configured to receive the first coupling interface 120. For such an embodiment, the first coupling interface 120 and the second coupling interface 122 allow for the slidable movement of the front cover 102 relative to the rear cover 104. According to the various alternative embodiments, the first coupling interface 120 and the second coupling interface 122 may have any of a number of suitable configurations so long as they allow for the detachable coupling of the front cover 102 to the rear cover 104.

According to the embodiment illustrated, the connection point between the first coupling interface 120 and the second coupling interface 122 defines the hinge 118 about which the front cover 102 is configured to rotate relative to the rear cover 104. According to the various alternative embodiments, the connection between the first coupling interface 120 and the second coupling interface 122 may be separate from the hinge 118.

Figure 7:
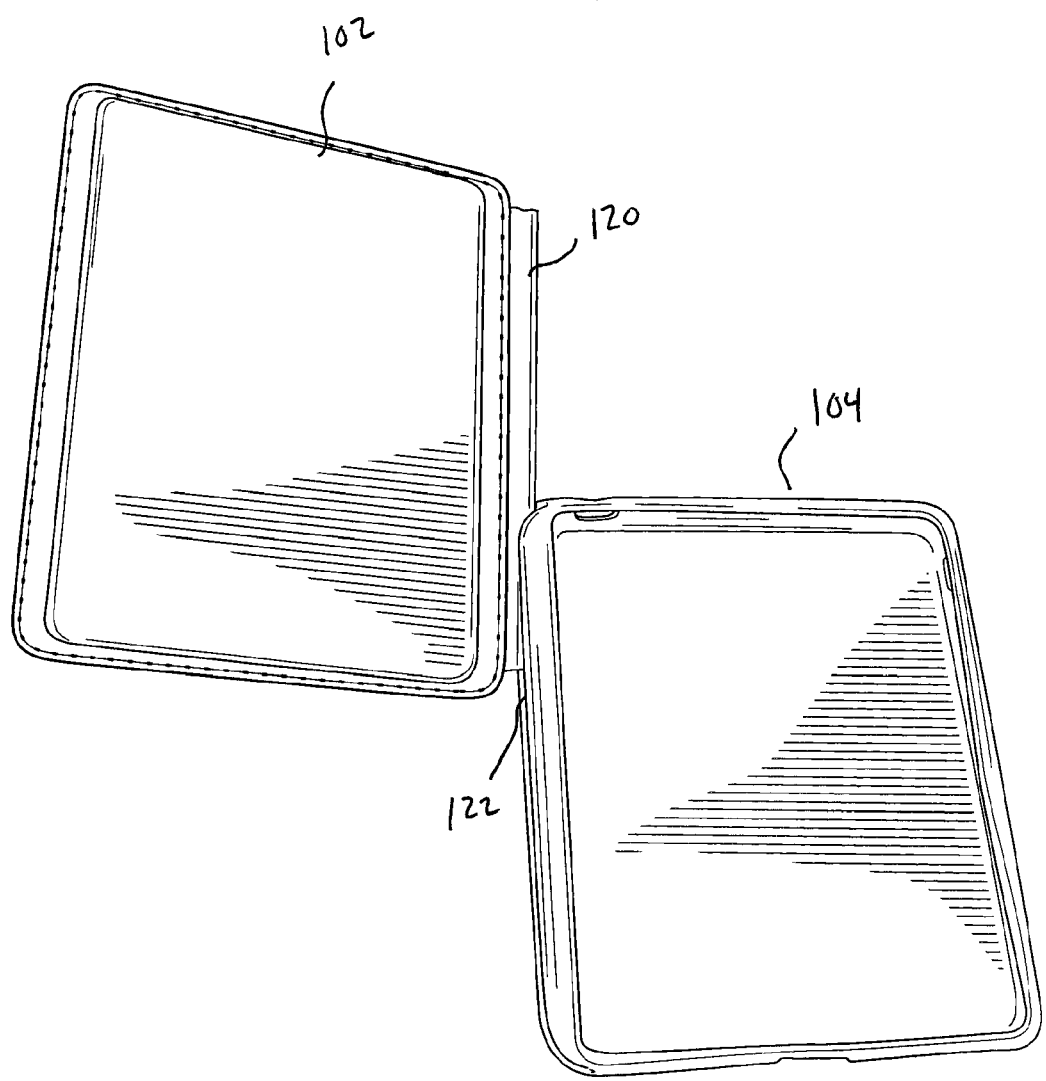
FIG. 7 is a top perspective view of the first cover portion and the second cover portion of the case of FIG. 1 in an intermediate installation position.
Figure 8:
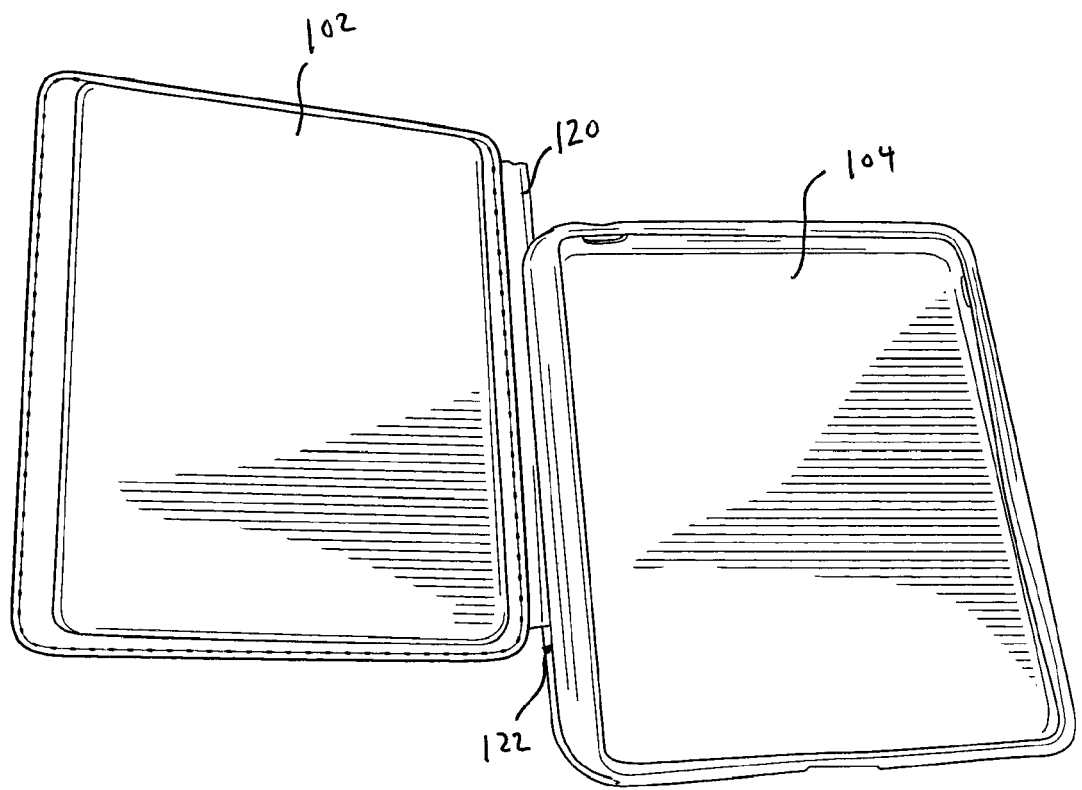
FIG. 8 is another top perspective view of the first cover portion and the second cover portion of the case of FIG. 1 in a further intermediate installation position.
Figure 9:
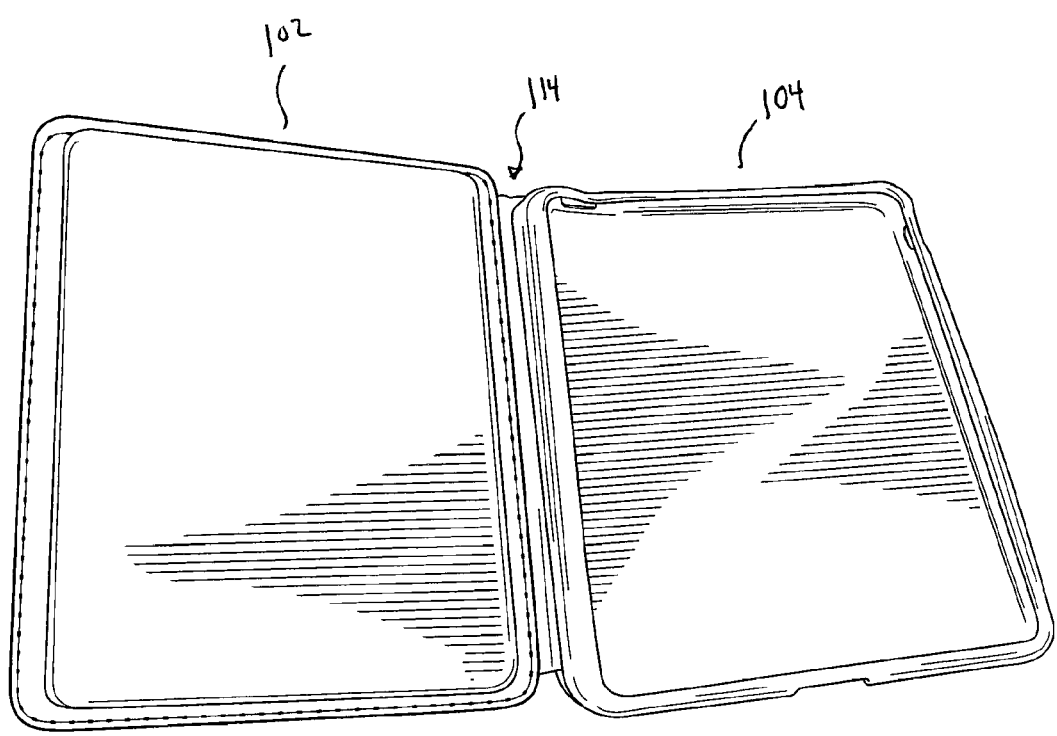
FIG. 9 is a top perspective view of the first cover portion and the second cover portion of the case of FIG. 1 in an installed position.

Referring to FIGS. 5 and 7-9, a method of installing a new or different front cover 102 onto the rear cover 104 is shown. Referring to FIG. 7, an end of the first coupling interface 120 is inserted to the second coupling interface 122. Once the first coupling interface 120 has engaged the second coupling interface 122, the front cover 102 can be slid downwards while the projection of the first coupling interface 120 remains within the channel of the second coupling interface 122. The process is reversible so that the front cover 102 can be removed in a similar manner and replaced yet again by another new or different front cover.

Figure 10:
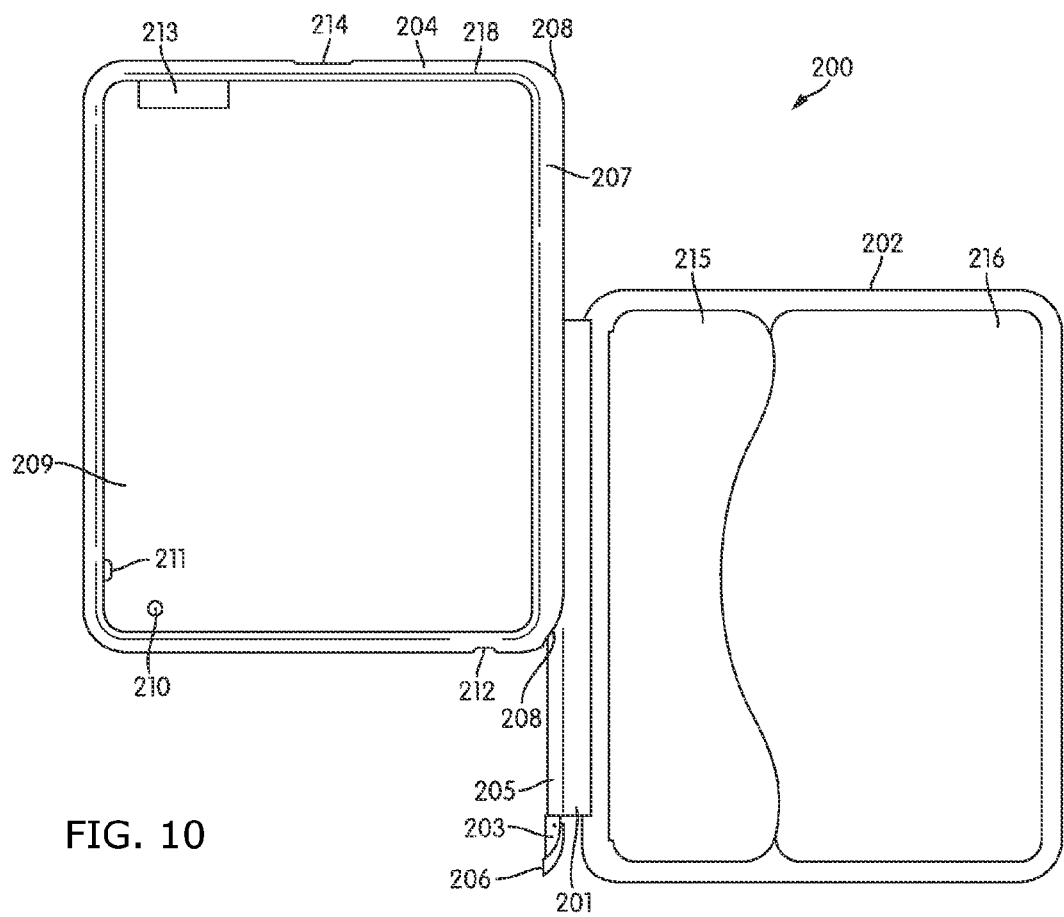
FIG. 10 is a top view of a case having a coupling component of one protective cover component partially positioned within a channel of an associated protective cover component according to another exemplary embodiment.

FIG. 10 is a top view of a case having a coupling component of one protective cover component partially positioned within a channel of an associated protective cover component according to another exemplary embodiment. As demonstrated in the illustrated embodiment, the front cover component 202 may include a plurality of auxiliary components and features. Some of the features may include hinge component 201. Hinge component 201 may be a flexible hinge in accordance with various embodiments and may be composed of a fabric, cloth, textile, rubber, or other flexible material suitable for repetitive bending. In some embodiments, the hinge may include a plastic flexure. In the embodiment illustrated in FIG. 10, the hinge component includes a channel 205 formed by an overlap of the flexible hinge material. Positioned in and extending through channel 205 is a rod 203, which in the illustrated embodiment includes a flange 206 positioned on an end of the rod to limit the travel of the rod within channel 208 disposed in a peripheral portion 207 of the opposing cover portion, rear cover component 204. Flange 206 may be tapered or angled along an axis of the rod 203 as shown in the illustrated embodiment or the flange may be substantially orthogonal to the axis. Furthermore channel 208 may include a counter-bore or counter-sink to permit flange 206 to sit flushly within the channel. In some embodiments, peripheral portion 207 may be composed of a different material than the rest of component 204. Rod 203 has a circular geometry in the illustrated embodiment, which geometry corresponds with the shape of channel 208. In accordance with various inventive embodiments, rod 203 and channel 208 may take on various other complimentary corresponding shapes, such as square, diamond, triangular, or other polygonal shape such that rod 203 may be slidably engaged with channel 208. Channel 208 includes an opening that extends along the channel through which a portion of the hinge 201 may extend as shown in the illustrated embodiment. The opening of the channel is configured to have a smaller cross sectional area than the channel or a narrower width than the greatest diameter (or width/height for non-circular shaped channels) of the channel measured from the same frame of reference. The variation in size of the channel 208 and an opening formed therein (through which the hinge extends) restricts the hinge from being inadvertently pulled in a radial direction from the channel. The variation in size may be discrete or it may be gradual, such that the channel 203 gets narrower further away from the cover component 204 towards the opening.

While hinge 201 is composed of multiple components in the illustrated embodiments, various inventive embodiments may include a hinge integrally formed of a single consistent material shaped to provide the required, flexibility and rigidity of the illustrated separate components. For example, rod 203 may be rigid in some embodiments in contrast to a flexible hinge 201 provided in some embodiments. Furthermore, hinge 201 may be formed in a plurality of discontinuous sections along a portion of the periphery of front cover component 202. In some embodiments, hinge 201 may include a coupling mechanism such as Velcro, a magnetic clasp, a snap fit or other interlocking hinge components for removably and rotatably coupling front cover component 202 to rear cover component 204. Additionally, hinge 201 may be positioned on the cover component configured to received the display device and the channel 208 may be similarly and complimentarily disposed on the front cover component 202, in accordance with various embodiments.

As illustrated in FIG. 10, front cover component 202 may include other auxiliary components such as ridge 216 formed, at least partially by flap 215, which flap is discussed in further detail herein. Ridge 216 may be provided with a shape, about the perimeter of the ridge or otherwise, that corresponds with the recessed region 209 of rear cover portion 204. Recessed region 209 permits rear cover portion 204 to receive and house a visual source or an electronic device such as an e-reader. Additionally, the edge of the cover component around the recessed may include a raised portion or ridge that prevents contact of a display of a device disposed within recess 209 from occurring, for example if the device is placed or dropped with the device display screen downward while the protective cover is in an open configuration.

Rear cover component 204 may be composed of one or more materials, which may include a flexible material that may also have a degree of elasticity to permit rear cover component to be conformally coupled to the device disposed therein. In some embodiments, rear cover portion 204 may include straps, brackets, clamps or other components for receiving and maintaining an electronic device therein. As shown in the illustrated embodiment, rear cover component 204 may also include one or more apertures 210-214 positioned in the component to permit access to one or more ports on an electronic device stored therein. Access to such ports permits various functions such as charging, connection of auxiliary components such as ear phones, speakers, or lights, exposure of components such as speakers or vents, and file sharing through uploading or downloading of information from or to a device positioned in rear cover component 204. As shown in FIG. 10, apertures 210-214 may be formed in the back surface of rear cover component 204, in a sidewall of rear component 204 or in the combination of the same.

Various components of case or cover 200 may be composed of a plurality of materials. By way of another non-limiting example, a first portion of the case, such as rear protective cover portion 204 may be composed of a plastic or rubber material, while a second portion of the case, such as front protective cover portion 202 may be composed, at least in part, of leather, and hinge 201 may be composed, at least in part, of a fabric.

Figure 11:
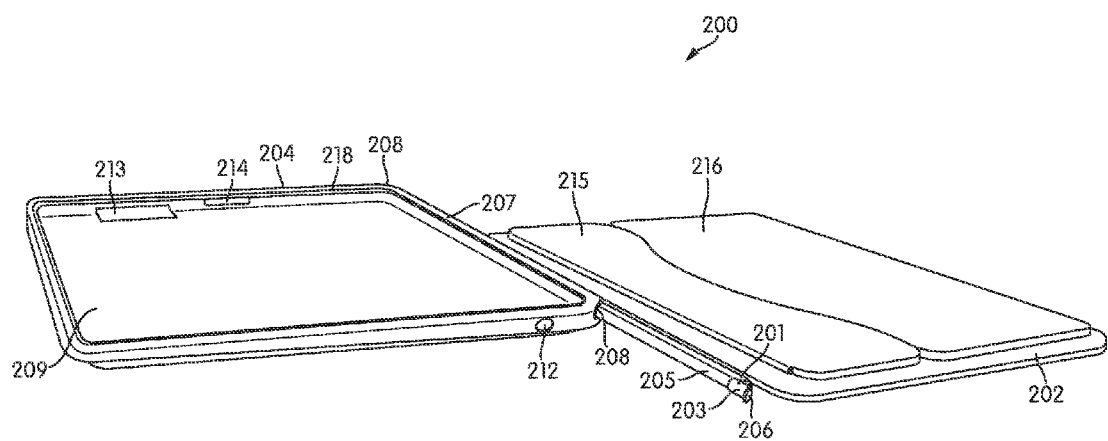
FIG. 11 is a perspective view of the case of FIG. 10.

FIG. 11 is a perspective view of the case of FIG. 10. The recessed region 209 and the depth of the same are readily viewable in the FIG. 11. Additionally, the ridge 216, (formed in part by flap 215) and the height of the same are also readily viewable in FIG. 11. As demonstrated in FIG. 11, a ridge 218 may be formed in cover component 204.

Figure 12:
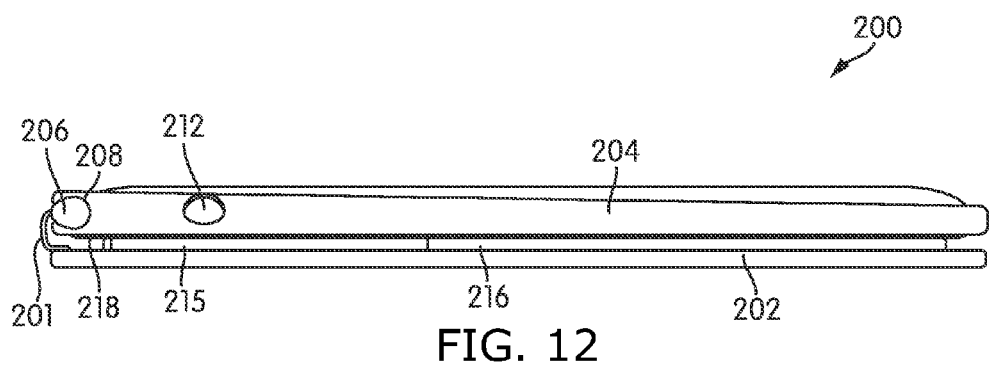
FIG. 12 is a top end view of the case of FIG. 10 in a closed configuration.
Figure 13:
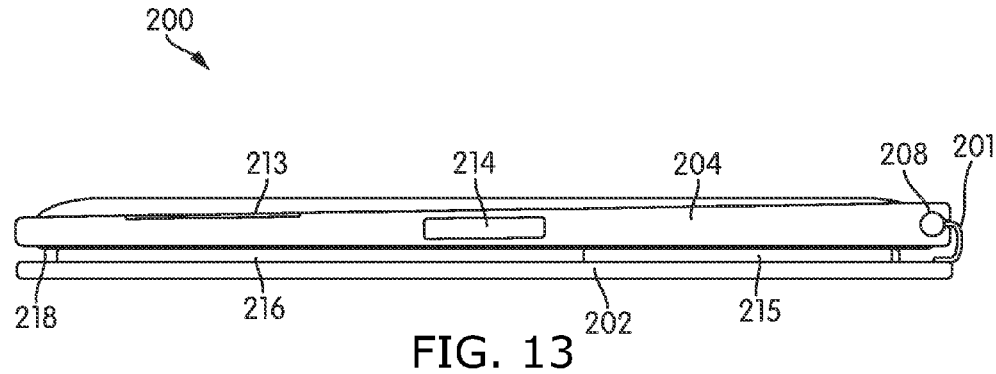
FIG. 13 is a bottom end view of the case of FIG. 10 in a closed configuration.

FIG. 12 is a top end view of the case of FIG. 10 in a closed configuration, and FIG. 13 is a bottom end view of the case of FIG. 10 in a closed configuration. A comparison of FIG. 12 and FIG. 13 provides an exemplary illustration of how channel 208 may be formed differently on each end. For example, as discussed above, the channel may include a counter-bore on one end, which may be specifically contoured to receive the flange 206 on rod 203. FIGS. 12 and 13 also demonstrate the flexibility of hinge 201 provided in the illustrated embodiment and the arc or bend that may be formed thereby when cover 200 is manipulated into the folded configuration. As further shown in FIGS. 12 and 13, peripheral portion 207, within which channel 208 is disposed and out of which opening 219 extends, may include a shape or profile that is distinct from cover component 204 and may in some embodiments be a coupled, but distinct component. In other embodiments, peripheral portion 207 may be integral with component 204 and may have the same shape or profile as component 204.

Figure 14:
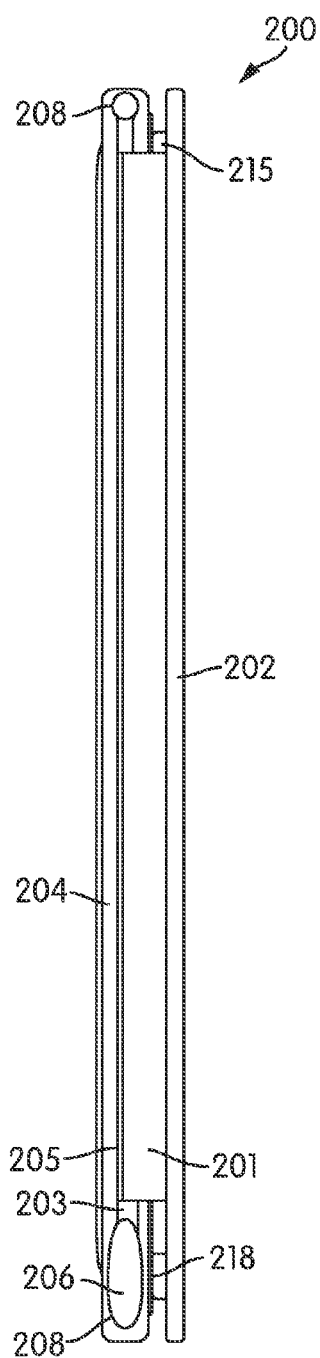
FIG. 14 is rear profile view of the case of FIG. 10 in a closed configuration.
Figure 15:
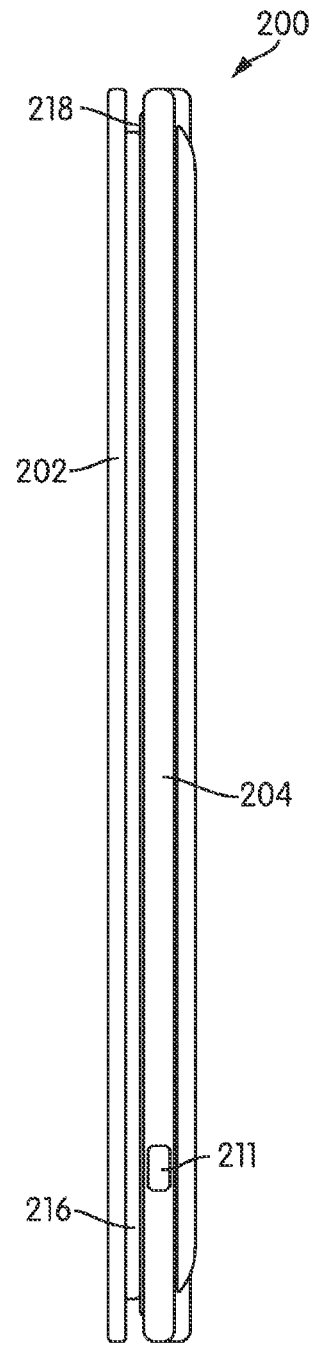
FIG. 15 front profile view of the case of FIG. 10 in a closed configuration.

FIG. 14 provides a rear profile view of the case of FIG. 10 in a closed configuration, and FIG. 15 provides front profile view of the case of FIG. 10 in a closed configuration.

Figure 16:
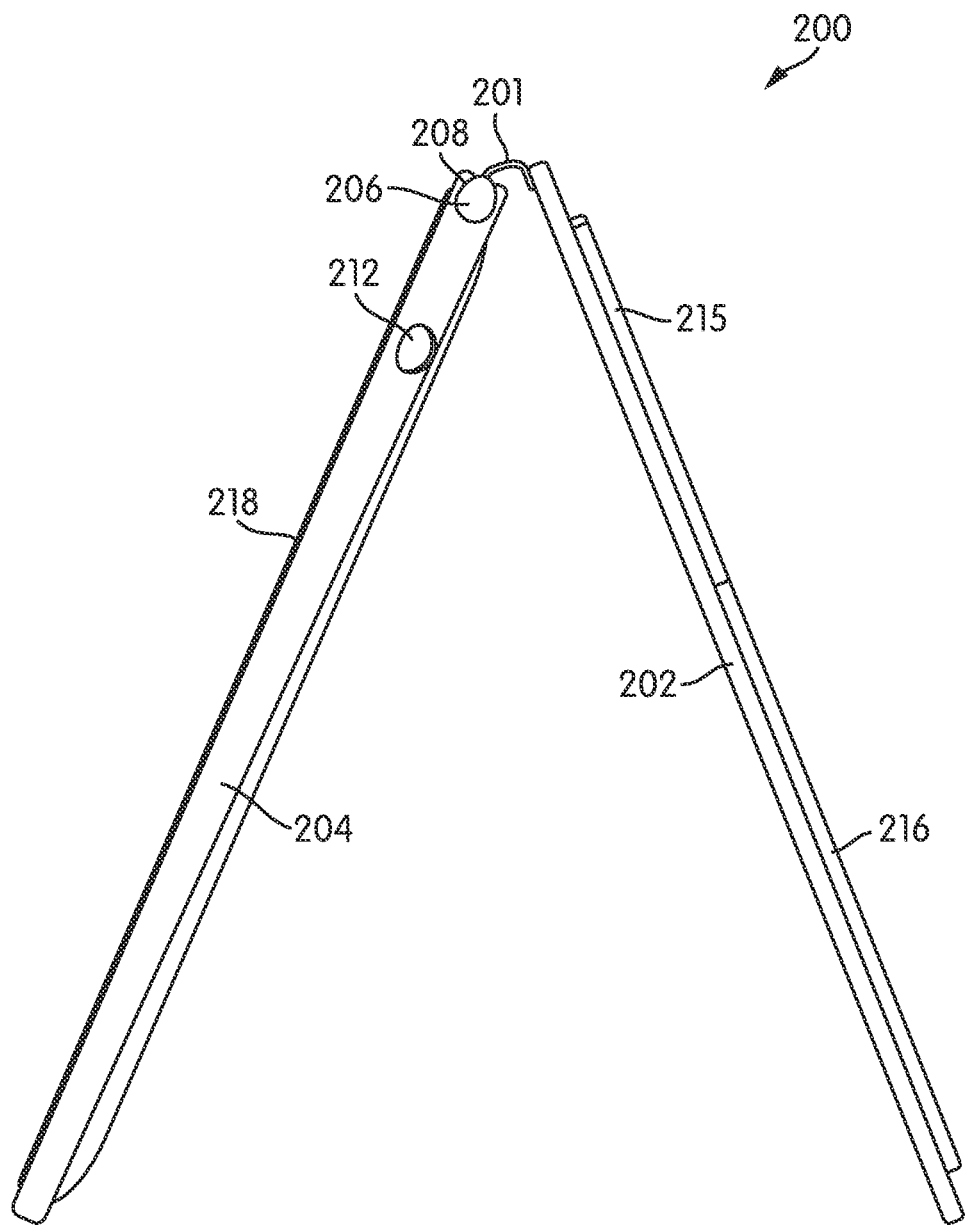
FIG. 16 is perspective view of the case of FIG. 10 opened and standing on a front and rear portion of the case.

FIG. 16 is perspective view of the case of FIG. 10 opened and standing on front cover component 202 and rear cover component 204, thereby permitted a device to be displayed in substantially upright landscape view for a user. The flexibility of hinge 201 permits the outer surface of front cover component 202 and the outer portion of rear cover component 204 to fold open, such that the surfaces outer surfaces of components 202 and 204 sit flush and co-planar with one another in accordance with various embodiments.

Figure 17:
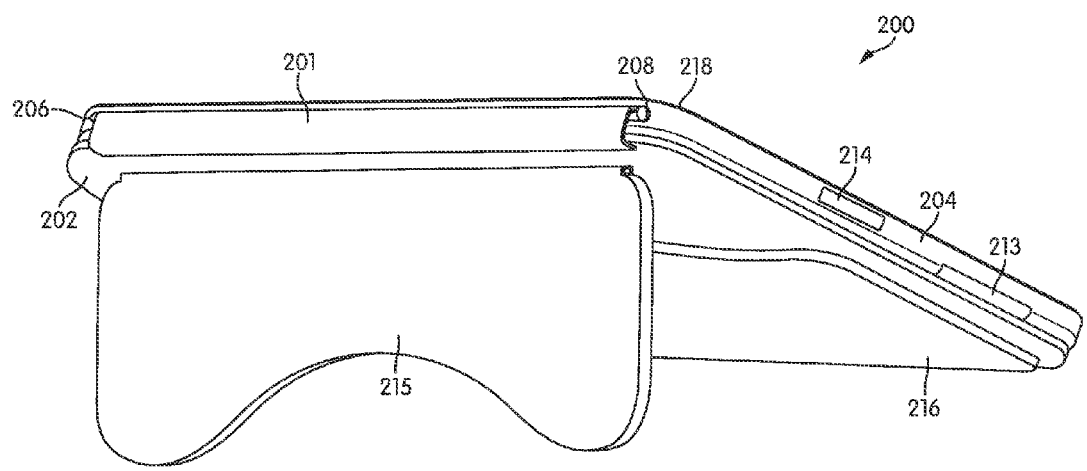
FIG. 17 is a rear perspective view of the case of FIG. 10 standing on an open flap of the case.

FIG. 17 is a rear perspective view of the case of FIG. 10 standing on an open flap of the case. Flap 215, is operable in various embodiments to permit partially raised landscape viewing of a device positioned within protective cover 200. In some embodiments, the flap may be configured to open in a direction orthogonal to the illustrated direction for partially raised portrait viewing of a device positioned within protective cover 200.

Figure 18:
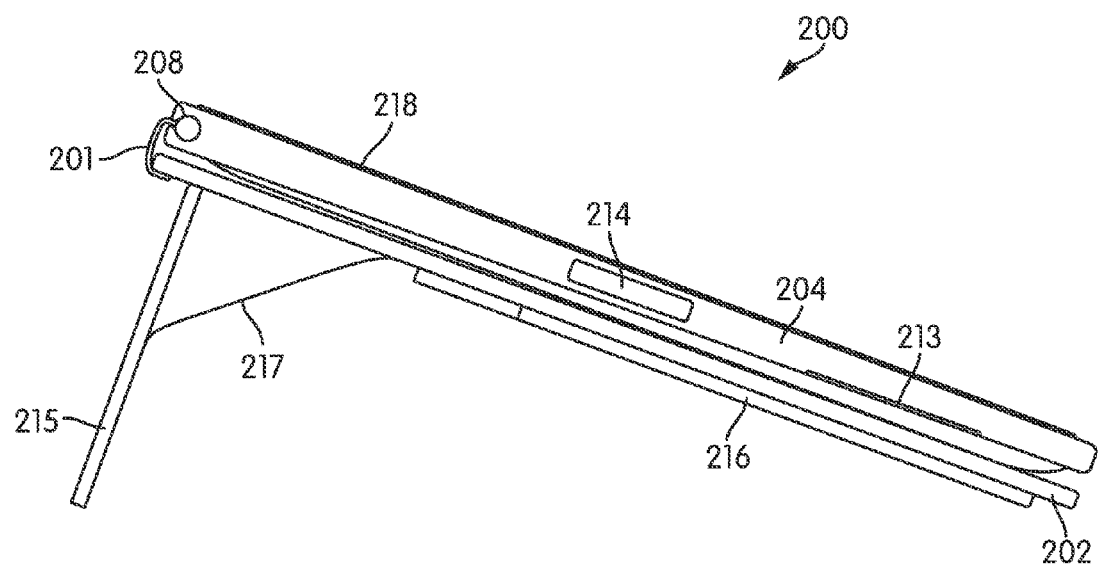
FIG. 18 is a top end view of the case of FIG. 10 in the configuration shown in FIG. 17.

FIG. 18 is a top end view of the case of FIG. 10 in the configuration shown in FIG. 17. As shown in FIG. 18 flap 215 may be coupled to a tether 217, which is also coupled to cover component 202 and limits the angle to which flap 215 opens. In some embodiments a magnet may be disposed in flap 215 and in cover component 202, which magnets may be oriented for attraction such that flap 215 remains closed when not forcibly opened.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An apparatus for protecting an electronic device, the apparatus comprising:
a protective cover comprising:
a first protective cover component including a peripheral portion having a channel disposed therein, the channel having a longitudinal axis and one or more peripheral walls extending along the longitudinal axis in the peripheral portion of the first protective cover component, the channel having an opening in at least one of the one or more peripheral walls, the opening extending along the longitudinal axis and at least partially along the at least one of the one or more peripheral walls, at least a portion of the opening being narrower than at least a portion of the channel, the first protective cover component having a first side portion; and a second protective cover component including a flexible hinge component extending from a peripheral portion of the second protective cover component, the flexible hinge component including a hinge portion shaped to correspond to the channel in the first protective cover component;

wherein one of the first protective cover component and the second protective cover component includes a recessed region configured to receive the electronic device, and the other of the first protective cover component and the second protective cover component includes a protruding ridge region having a shape corresponding with the recessed region, the protruding ridge portion fitting in alignment with the recessed region when the second protective cover rotates about the flexible hinge component to a closed position;

the protruding ridge region including a flap rotatable when the second protective cover component rotates about the flexible hinge component to a first open position to support the apparatus in a first inclined position, and wherein the second protective cover component is configured to support the apparatus in a second inclined position different from the first inclined position when the second protective cover component rotates about the flexible hinge component to a second open position different from the first open position.

2. The apparatus of claim 1, wherein the first protective cover component is releasable coupled to the second protective cover component via the channel and the hinge portion.

3. The apparatus of claim 2, wherein the first protective cover component is rotatably coupled to the second protective cover component.

4. The apparatus of claim 2, wherein the first protective cover component includes the recessed region configured to receive the electronic device.

5. The apparatus of claim 4, wherein the second protective cover component includes a magnetic switched configured to switch an electronic device positioned in the first protective cover component on or off.

6. The apparatus of claim 4, wherein the first protective cover component is composed of a first material and the second protective cover component is composed of a second material distinct from the first material.

7. The apparatus of claim 4, wherein the first protective cover component includes a first material selected from the group consisting of a plastic, a rubber, and a polymer and wherein the second protective cover component includes a second material selected from the group consisting of a fabric, a leather, a canvas, and a vinyl.

8. The apparatus of claim 4, wherein the second protective cover component is formed as a panel.

9. The apparatus of claim 4, wherein the second protective cover component is formed as a plurality of panels.

10. The apparatus of claim 1, wherein the flap is configured such that in a folded state the flap is parallel to a surface of the protective cover component and in an unfolded state the flap extends from the surface.

11. The apparatus of claim 10, wherein the flap is connected to a tether, the tether connected to at least one of the first protective cover component and the second protective cover component.

12. The apparatus of claim 1, wherein at least one of the first protective cover component and the second protective cover component is composed of a material selected from the group consisting of: a rubber, a leather, a fabric, a polymer, and a plastic.

13. The apparatus of claim 1, wherein at least one of the first protective cover component and the second protective cover component is composed of rubber.

14. The apparatus of claim 1, wherein at least one of the first protective cover component and the second protective cover component includes one or more apertures permitting access to an port in an electronic device positioned within one of the first protective cover component and the second protective cover component.

15. The apparatus of claim 1, wherein the channel includes an opening at a first end and a second end of the channel.

16. The apparatus of claim 1, wherein the hinge portion includes a flexible portion and rod coupled to the flexible portion.

17. The apparatus of claim 16, wherein the flexible portion is composed of fabric.

18. The apparatus of claim 16, wherein the flexible portion is composed of rubber.

19. The apparatus of claim 16, wherein the rod has a round cross section.

20. The apparatus of claim 16, wherein the rod has a circular cross-section.

21. The apparatus of claim 16, wherein the rod has an oval cross-section.

22. The apparatus of claim 16, wherein the rod has a rectangular cross section.

23. The apparatus of claim 16, wherein the rod has a polygonal cross section.

24. The apparatus of claim 16, wherein the rod including a flange positioned at an end of the rod and wherein the flange is wider than the channel whereby the flange prevents the rod from sliding completely through the channel.

* * * * *